US006886585B1

(12) United States Patent
King Jr. et al.

(10) Patent No.: US 6,886,585 B1
(45) Date of Patent: May 3, 2005

(54) SOFT GRIP DRAIN

(75) Inventors: L. Herbert King Jr., Chesterfield, MO (US); Glenn Hoffman, Eureka, MO (US)

(73) Assignee: The Patent Store LLC, St. Charles, MO (US)

( * ) Notice: Subject to any disclaimer, the term of this patent is extended or adjusted under 35 U.S.C. 154(b) by 0 days.

(21) Appl. No.: 10/877,381

(22) Filed: Jun. 25, 2004

(51) Int. Cl.[7] .......................... B23P 15/52; E03B 7/08; F16K 31/60; F16L 55/07; G05G 1/10

(52) U.S. Cl. .......................... 137/318; 16/430; 16/433; 16/441; 16/DIG. 19; 74/543; 74/553; 74/558; 137/236.1; 405/36; 405/39

(58) Field of Search .......................... 16/430, 433, 441, 16/DIG. 19, DIG. 30; 74/543, 551.9, 552, 74/553, 558; 137/236.1, 318; 222/80, 81, 222/91, 494, 495; 239/542; 251/215, 216, 251/349, 351, 352; 405/36, 37, 39; 408/102, 408/137, 138; 174/84 R, 87

(56) References Cited

U.S. PATENT DOCUMENTS

| | | | | | |
|---|---|---|---|---|---|
| 784,305 | A | * | 3/1905 | Cornforth | 16/433 |
| 963,166 | A | * | 7/1910 | Mueller | 16/441 |
| 1,001,672 | A | * | 8/1911 | Mueller | 16/441 |
| 1,564,957 | A | | 12/1925 | Heyn | 74/558.5 |
| 2,721,597 | A | | 10/1955 | Pitrella | 74/553 |
| 2,731,056 | A | | 1/1956 | Anson | 150/155 |
| 2,803,032 | A | | 8/1957 | Barnsley | 16/432 |
| 3,072,955 | A | | 1/1963 | Mitchell | 294/171 |
| 3,343,724 | A | * | 9/1967 | Malpas | 137/318 |
| 3,460,715 | A | * | 8/1969 | Jones et al. | 137/318 |
| 4,165,659 | A | | 8/1979 | Fawley | 74/558 |
| 4,999,875 | A | | 3/1991 | Rybak | 16/432 |
| 5,097,566 | A | * | 3/1992 | Decker et al. | 16/421 |
| 5,105,844 | A | * | 4/1992 | King, Sr. | 137/318 |
| 5,469,758 | A | | 11/1995 | Howie, Jr. | 74/553 |
| 5,495,641 | A | | 3/1996 | Going et al. | 16/414 |
| 5,685,328 | A | | 11/1997 | Helmsderfer | 137/375 |
| 5,694,972 | A | * | 12/1997 | King | 137/318 |
| 5,857,242 | A | * | 1/1999 | Pizzo et al. | 16/441 |
| 6,112,619 | A | | 9/2000 | Campbell | 74/553 |
| 6,131,972 | A | * | 10/2000 | Whitehead et al. | 16/430 |
| 6,154,928 | A | | 12/2000 | Thom | 16/414 |
| 6,199,447 | B1 | * | 3/2001 | Lump et al. | 74/551.9 |
| 6,216,723 | B1 | * | 4/2001 | King | 137/318 |
| 6,363,579 | B1 | | 4/2002 | King, Jr. | 16/430 |
| 6,434,793 | B1 | * | 8/2002 | Ensson | 16/441 |
| 6,513,200 | B2 | * | 2/2003 | Yang | 16/441 |
| 6,571,427 | B2 | * | 6/2003 | Agate et al. | 16/441 |
| 6,610,382 | B1 | | 8/2003 | Kobe et al. | 428/100 |
| 6,677,530 | B2 | | 1/2004 | Blaha et al. | 174/87 |
| 6,681,796 | B2 | * | 1/2004 | King, Jr. | 137/318 |

* cited by examiner

*Primary Examiner*—George L. Walton
(74) *Attorney, Agent, or Firm*—Jacobson & Johnson

(57) ABSTRACT

A tool having a hand gripping region for rotational attachment to an irrigation system with the tool having soft bumps thereon spaced from each other and affixed to the hand gripping region to cushion the user's hand as an irrigation component is field attached to an irrigation system.

22 Claims, 3 Drawing Sheets

SOFT GRIP DRAIN

FIELD OF THE INVENTION

This invention relates generally to irrigation products and, more specifically, to irrigation components such as pipe taps that have a hand gripping region to enable the operator in the field to hand attach a pipe tap to an irrigation system through rotation of the pipe tap.

CROSS REFERENCE TO RELATED APPLICATIONS

None

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of covers of resilient material or cushions for consumer articles such as gas valves, door knobs and the like in order to protect the users hand from heat or cold or make it easier for a disabled person to open and close a door are known in the art. For example, coverings extending over a smooth surfaced handle or smooth surface door knob are used for the purpose of making it easier for a disabled person to grip the handle, in other cases the covering is used for thermally isolating the user's hand from the handle in order to prevent the user from burning his or her hand.

In the irrigation field a number of different components are assembled at the work site. The field assembly of components generally involves "one shot applications" which usually include hand attachment of irrigation components, such as pipe taps, to irrigation pipes. One type of pipe tap comprises a drainage valve that has male threads that mate with a threaded connection on an irrigation pipe and another pipe tap comprises a self tapping pipe tap that mounts in a saddle with a barrel on the tap that frictional engages an irrigation pipe to form a leakproof connection between the pipe tap and the irrigation line. Since these units usually require substantial torque to attach the valve generally ears or projections are molded into the integral handle on the taps.

In general, the pipe taps have a rigid housing and are made from hard plastic materials. The pipe taps are secured to a pipe by rotation of an integral handle on the pipe tap with respect to the pipe. For example, one can field attach a pipe tap such as a threaded drainage valve to an irrigation line through a set of mating threads that are located on the drainage valve and on the irrigation line. In other cases, a pipe tap having a pipe tap handle is used in conjunction with a pipe saddle to allow a user to field attach a pipe tap to an irrigation line without the need for tools. In general, the field assembly with "one shot" components such as pipe taps requires that the pipe taps need to be firmly connected to the irrigation system to prevent leakage. This field attachment process usually requires the user to apply a substantial hand torque to the pipe tap to obtain the proper leak proof connection therebetween. For this reason the handle or hand gripping region on pipe taps usually includes ears on the rigid rim or recess in the rigid rim.

One such pipe tap is shown in U.S. Pat. No. 6,363,579 and comprises a hand attachable drain valve made from a rigid material. The rigid hand gripping region including rigid ears and rigid serrated friction ridges located between the ears to enhance the ability of the user to firmly grasp and rotate the drain valve as it is field attached to an irrigation system. The finger gripping regions allow a user to easily begin the threading process. Since the tap should be securely attached to the irrigation system the protruding ears provide a handle so the user can increase his or her hand contact on the ears and consequently increase the rotational torque through either formation of a mechanical type interlock produced by the circumferential engagement of the ears or protrusions with the user's fingers or through frictional engagement of the palm of the user's hand with the rigid ears. These type of rigid hand shaped handles permit a user to quickly and tightly secure an irrigation component such as a drainage valve to an irrigation system to form a leakproof connection in the field attachment process.

Oftentimes the user must attach a number of irrigation components or taps to an irrigation system as is it is being built. The repeated harsh engagement between the users hand and the irrigation component, can effect the tightening of the tap. It is important to properly secure the irrigation valve to produce leakproof connections through "on site" hand tightening even though attachment of multiple irrigation components can case a user to develop a sore hand from gripping and securing multiple rigid taps.

The present invention comprises an improvement to the irrigation components that allows one to retain the ability to generate a high hand torque while at the same time reducing the harsh hand engagement by providing a soft bump on the peripheral surface or on at least a portion of the peripheral surface that form pressure points. The soft bumps on the hand gripping region of the peripheral surface enables one to reduce the effect of the continued harshness of the engagement with the user's hand as multiple irrigation components are attached to an irrigation system. The soft bumps also reduces hand fatigue that occurs when a number of components have to be rotatably connected through hand tightening in the field. In the addition, the soft bumps can be made from materials that not only conform to the users hand but provide an increased frictional resistance or a non-slip surface between the user's hand and the irrigation component and thus aid in the securement of the tap. The present invention allows one to reduce the harshness of hand engagement even though there may only be partial covering of the hand gripping region of the irrigation tool.

SUMMARY OF THE INVENTION

Briefly, the present invention comprises a rotateable rigid irrigation component having a hand gripping region for field attachment to an irrigation system with the hand grasping portion of the rigid rotatable irrigation valve having soft bumps thereon. In one embodiment the soft bumps include a set of resilient pads spaced from each other and affixed to the handle to at least partially cushion the user's hand when the component is attached to an irrigation system and in additional embodiments the soft bumps are incorporated into a cover or hood that slips over a handle.

DESCRIPTION OF THE PREFERRED EMBODIMENT

Figure 1:
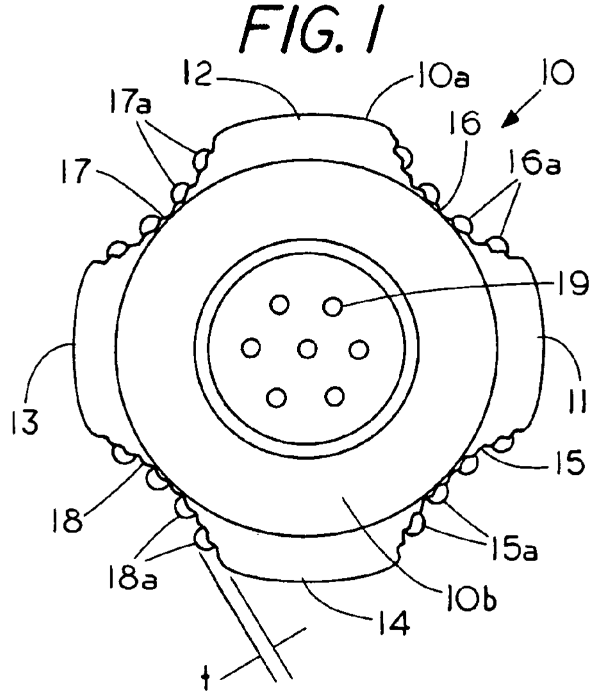
FIG. 1 is a top view of a hand attachable irrigation valve.
Figure 2:
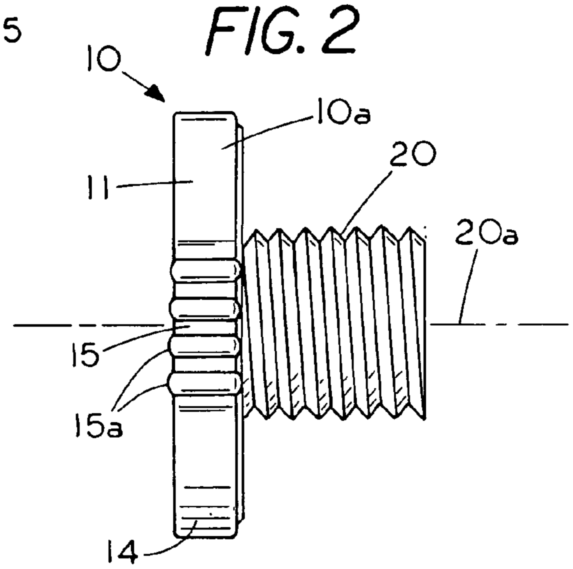
FIG. 2 is a side view of the hand attachable irrigation valve of FIG. 1.

FIG. 1 is a top view of a rigid, hand-attachable and rotatable irrigation valve 10 comprising a rigid housing having a hand gripping region formed by a peripheral surface 10*a* with the peripheral surface 10*a* including a set of rigid radially protruding ears 11, 12, 13 and 14 and a set of rigid radially recessed finger gripping regions 15, 16, 17 and 18 which are circumferentially spaced around the peripheral outer surface 10*a* of irrigation valve 10 to provide a rigid rotatable member 10*b* that extends radially outward from thread base 20 to form a handle (see FIG. 2). Rigid peripheral outer surface 10*a* extends substantially parallel to an axis of rotation corresponding with the axis of rotation 20*a* of threads 20 and provides a hand gripping region to enable one to rotate irrigation valve 10.

The irrigation drain valve 10 is generally made from a rigid polymer plastic such as PVC or the like and is referred to as a pipe tap since the drain valve attaches or is tapped into to a sidewall of a pipe. A set of openings 19 located in the center of drain valve 10 allows for water to drain from the valve 10. In the embodiment shown, a set of soft bumps comprising elongated resilient pads 15*a* are located in a spaced relationship on the concave rigid finger gripping region 15 which is formed directly in the peripheral surface 10*a* of rigid valve 10. Similarly, a set of soft bumps comprising elongated resilient pads 16*a* are located on the concave finger gripping region 16, a set of soft bumps comprising elongated resilient pads 17*a* are located on the concave finger gripping region 17 and a set of soft bumps comprising elongated resilient pads 18*a* are located on the concave finger gripping region 18. The bumps 15–18 can provide multiple purposes in that they can provide a cushion as well as in some instance provide a more positive gripping region either through having a higher coefficient of friction than the rigid material or by forming mechanical protrusions. FIG. 1 shows the soft bumps have a thickness "t". When the soft bumps comprise soft compressible bumps they can compress sufficiently to bring a finger or hand on the soft compressible bumps into simultaneous contact with the rigid peripheral surface 10*a* and the soft compressible bumps. That is, the soft compressible bumps have a compressed thickness that allows a portion of the flesh of a users hand to simultaneously engage the soft compressible bumps and the rigid peripheral surface 10*a.*

In the embodiment shown the irrigation valve becomes its own tool since a portion of the rigid irrigation valve is used and grasped as a tool to attach the irrigation valve to a tee or the like on the main irrigation valve.

FIG. 2 shows a side view of the hand attachable irrigation valve 10 showing the radially protruding ears 11 and 12 separated by a finger gripping region 15. Protruding from the end of the drainage valve 10 housing is a set of male threads 20 on which are to be threadingly engaged with mating female threads on another irrigation component. The soft bumps 15*a* which are located on the peripheral region of the drain valve 10 are spaced from each other and provide islands of soft cushions or soft resilient pads on the rigid material to reduce the harshness of the hand and finger engagement with the rigid rotatable valve 10. That is, the soft bumps can resilient deform in response to finger and hand pressure thereon thus avoiding the harsh engagement that occurs between a rigid protrusion and a user's hand or fingers.

In the embodiment shown in FIG. 1 and FIG. 2 the soft bumps are spaced from each other to allow the user to simultaneous contact both the rigid valve surface and the soft bumps. Thus in the embodiment of FIG. 1 and FIG. 2 the rotateable irrigation valve retains the interlocking finger engagement obtainable with the protruding ears but at the same time interrupts the rigid contact area with the soft bumps thus minimizing the harshness of the engagement without sacrificing the ability to apply a substantial hand torque to the irrigation component.

Figure 3:
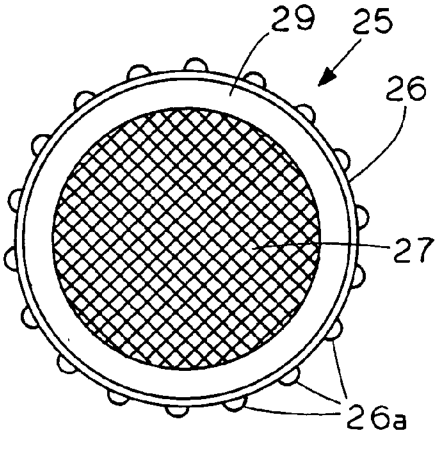
FIG. 3 is a top view of a drainage valve.

FIG. 3 is a top view of a rigid drainage valve 25 having a circular hand gripping region or rim 26. A drain pad 27 is centrally located in drainage valve 25. Circumferential spaced around the rim 26 is a set of soft bumps comprising hemi-cylindrical shaped elongated resilient pads 26*a* each of the soft bumps radially protrude from the rim peripheral surface 26 so as to be compressively squeezeable when a user grasp a rotatable drain valve 25 in his or her hand. In the embodiment of FIG. 3 a rigid rotatable member 29 supports band 26 that carries the soft bumps 26*a* In this embodiment a radial force on the users hand simultaneously contacts both the soft bumps 26*a* and the peripheral band 26 to provide hand cushioning.

Figure 4:
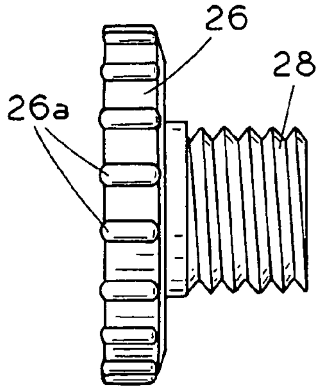
FIG. 4 is a side view o the drainage valve of FIG. 3.

FIG. 4 is a side view of the drainage valve 25 of FIG. 3 showing the male thread 28 that is to be threading engaged with a female thread on another irrigation component. Rotatable drainage valve 25 is secured to the irrigation system or to another component through hand rotation of the drainage valve 25. The soft bumps 26*a*, which are spaced around the rim 26 provide a cushion for the user's hand to alleviate the normal harsh engagement between the rim 26 and the user's hand. That is, the soft bumps 26*a* provide for enhanced engagement since both the hand and the soft bumps can form deformable contact with each other to minimize or avoid regions of excessive pressure that can occur between a rigid surface and the soft hand of a user which can result in trauma to the user's hand.

Figure 5:
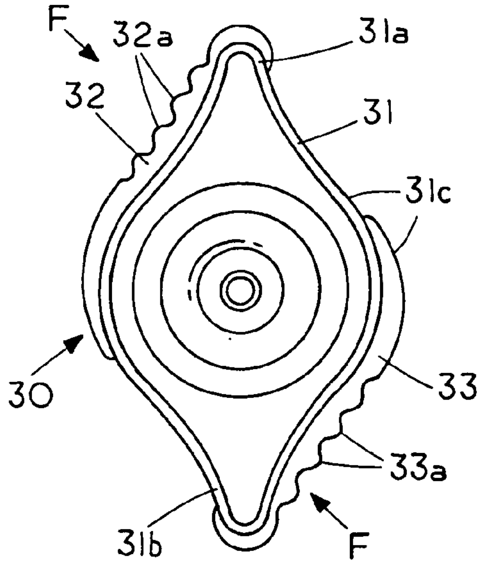
FIG. 5 is a top view of a pipe tap with ears extending outward from the pipe tap.
Figure 6:
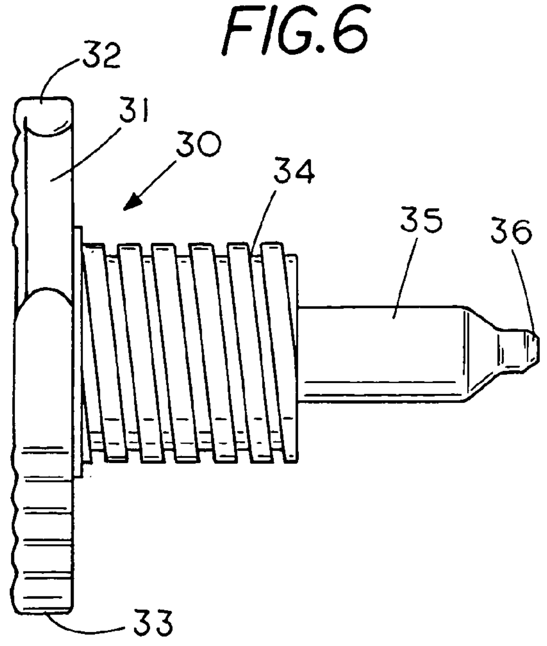
FIG. 6 is side view of the pipe tap of FIG. 5.

FIG. 5 is a top view of a frictional pipe tap 30 and FIG. 6 is side view of the frictional pipe tap 30. Pipe tap 30 includes a set of threads 34 and a protruding barrel 35 with a cutting tip 36 for boring an opening in a plastic pipe or the like. The pipe tap is conventionally mounted in a saddle that is secured around a pipe with the saddle having a mating female thread to allow the pipe tap to be drawn into cutting engagement with an irrigation pipe. In this type of tap the barrel 35 is brought into frictional engagement with a pipe after the a hole has been formed in the plastic irrigation pipe.

In the embodiment shown in FIG. 5 and FIG. 6 the rigid rotatable pipe tap 30 has a hard rim 31 that contains protruding ears 31*a* and 31*b* that provide for greater torsional leverage on the pipe tap. The peripheral surface 31*c*, which extends around the hard rim 31 and includes portion of rim 31 and the soft bumps 32 and 33 provides the hand gripping region to enable a user to rotate the tap 30. In order to reduce the harsh engagement between the hard rim 31 and the users hand while still maintaining the necessary torque pressure on the rim there is provided a soft bump 32 comprising a peripheral extending pad having integral protrusions or bumps 32*a* that extends along one side of ear 31*a* and a second soft bump 33 comprising a peripheral extending pad having integral protrusions or bumps 33*a* that extends along an opposite side of ear 31*b*. The peripheral and elongated soft bumps 33 and 32 provide a cushion for the users hand to minimize hand trauma. That is as one applies torque as indicated by arrows F the user's hand contacts the soft bumps 33 and 32 that extend partly along the hard or rigid ring 31. The soft bumps 32 and 33 flexibly deform to the users hand without creating the high pressure points associated with the engagement between a hard rim and the flesh of a user's hand. As the user grasps the peripheral surface with the hand gripping regions the user hand can simultaneously contact both the rigid portion of ears 31*a* and 31*b* as the user places his or her hand around the peripheral surface 31*c* of rotatable tap 30. If desired the soft bumps can extend beyond the edges of the rotateable pipe tape to protect the users hands from contacting an edge of the rotatable pipe tap. In addition, the soft bumps can be placed over and sharp edges or mold parting lines of the rotateable pipe tap to further protect the user's hand.

Figure 7:
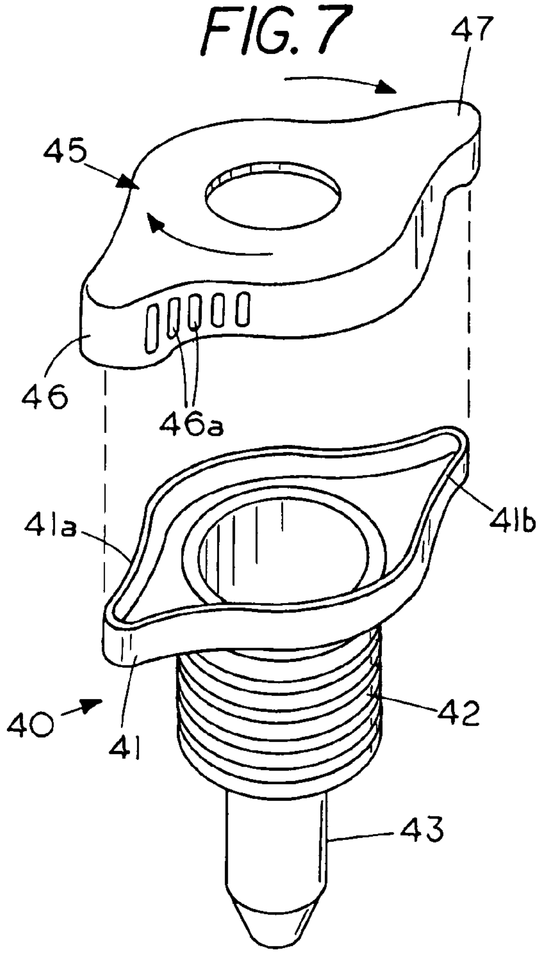
FIG. 7 is a perspective view of an open end pipe tap with a hood having elongated ears with a set of resilient pads located on the outside of the hood.

FIG. 7 is a perspective view of an open end pipe tap 40 having radial protruding rigid ears 41*a* and 41*b* and a threaded barrel 42 with an extension 43 for cutting an opening in an irrigation pipe. Located above the pipe tap 40 is a hood 45 having a top surface 47 and a side surface 46. Hood 45 comprises a rigid material that has an interior surface (not shown) that snugly fits over the rim 41 of pipe tap 40. A set of soft bumps 46 comprising elongated pads are located on side surface 46 to provide a cushion grip that reduces the harshness of the contact between a users hand and the hard hood, similarly, an identical set of soft bumps (not shown) comprising elongated pads are located on the opposite side of hood 45 to provide a cushion grip that reduces the harshness of the contact between a users hand and the hard hood. Thus in the present invention one can use the hood 45 in conjunction with an existing pipe tap since one can form an interlocking engagement between the rigid hood 45 and the rigid rim 41. The positioning of soft bumps 46*a* on one ear of the hood and the positioning of a second set of soft bumps on the opposite ear (not shown) allows one to prove a cushion grip to the user that reduces the normal harshness of hand engagement with a rigid rim. In this embodiment ones hand can simultaneously contact both the rigid peripheral surface and the soft bumps to provide a cushion to the users hand.

Figure 8:
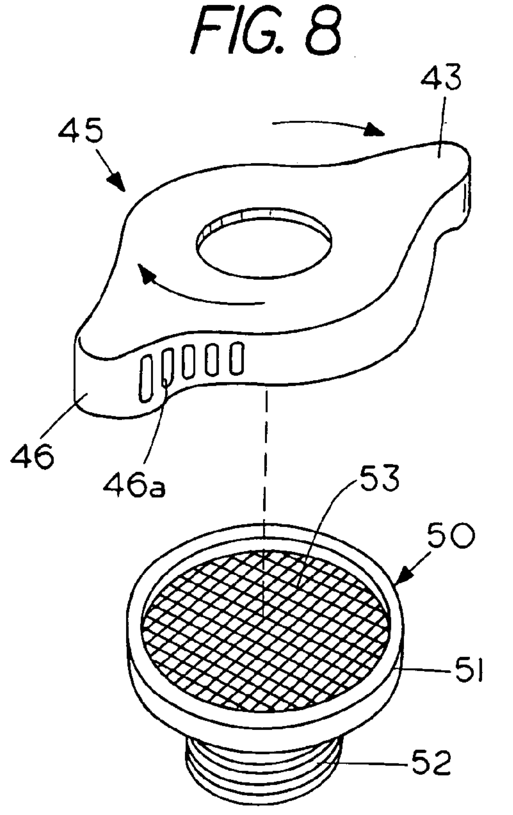
FIG. 8 is a perspective exploded view of the hood of FIG. 7 for engagement with a circular drainage valve.

FIG. 8 is perspective exploded view of the hood of FIG. 7 for engagement with a circular drainage valve 50 having a drain pad 53 a rigid rim 51 and a set of male threads 52. In the embodiment shown the hood 45 is made from rigid but slight deformable material so as to enable one to frictionally engage the rim 51. The use of the soft bumps 46 allows one to minimize the harsh engagement that normally occurs between a user's hand and a rigid irrigation component. In addition to providing a soft grip the material can be formed from material having a higher coefficient of friction then the rotateable pipe tap to thereby enhance a user's ability to rotate the tap without having his or her hand slip.

Figure 9:
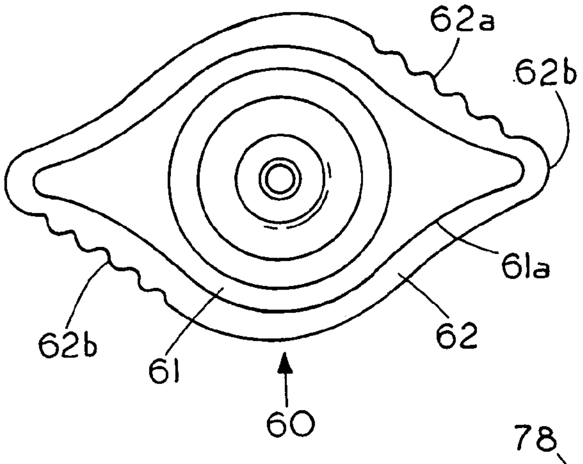
FIG. 9 is a top view of a rigid component with a circumferential resilient pad.

FIG. 9 is a top view of a rigid component 60 comprising a pipe tap having a rigid rim 61 with a continuous bump comprising a circumferential resilient pad 62 extending around the rim 61. A set of integral soft bumps 62*a* and 62*b* are included to enhance the gripping of the user. The embodiment of FIG. 9 proves a continuous circumferential soft bump that extends around the rigid rim with a further set of integral soft bumps 62*a* and 62*b*. In the embodiment shown the soft bump 62 can be secured to the rigid rim 61 by adhesives or molded directly on the rigid rim 61.

Figure 10:
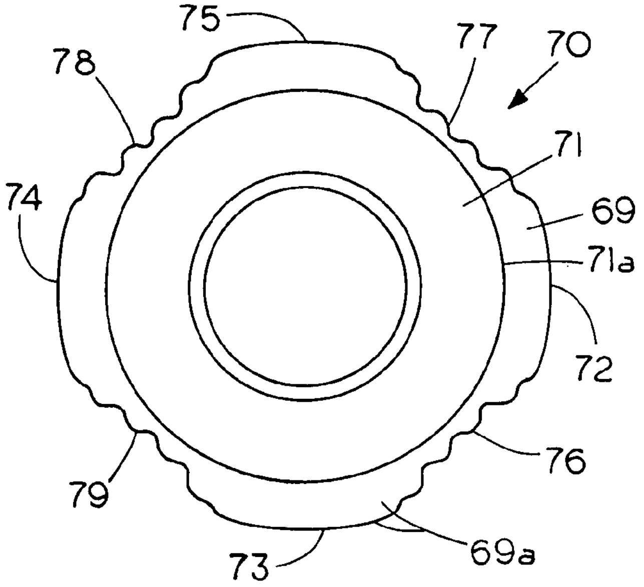
FIG. 10 is a top view of a drainage valve with a circumferential resilient pad on the hand gripping region.

FIG. 10 is a top view of a drainage valve 70 having a circular rigid housing 71 that is surrounded by a 360 degree circumferential resilient pad 69 on the normal ridge hand gripping region on drainage valve 70. In the embodiment of FIG. 10 the ears 72, 73, 74 and 75 as well as the finger recesses 76, 77, 78 and 79 with integral soft bumps are all formed in the soft circular pad 69 so as to provide a continuous region that deformably responds to hand pressure regardless of how the drainage valve is grasped.

Figure 11:
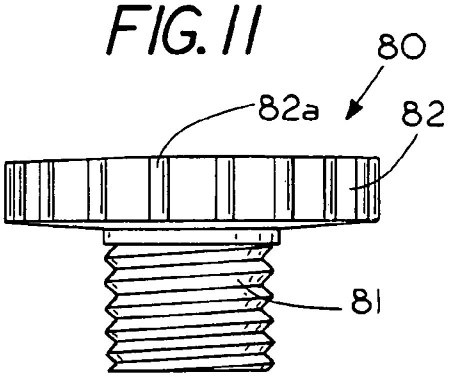
FIG. 11 is a side view of a drainage valve with a circumferential resilient pad.
Figure 12:
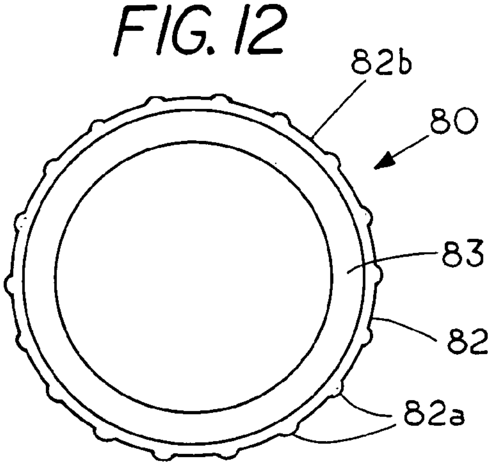
FIG. 12 is a top view of the drainage valve of FIG. 11.

FIG. 11 and FIG. 12 show a circular drainage valve 80 with a rigid circular rim 83 surrounded by a continuous soft bump comprising a peripheral band 82 that is secured to ridge rim 83. The soft bump 82 includes integral soft protrusions or bump 82 can be smooth. That is if greater frictional resistance is need one can introduce slight protrusions into the bump 82. In any event the soft bump 82 on the rim 83 reduces the harsh engagement between the users hand and the drainage valve as one rotates the drainage valve into position on the irrigation pipe.

In general the irrigation component of FIG. 1 includes a housing 10 with a rigid rotatable member 10*b* extending therefrom with a rigid peripheral surface 10*a* on rigid rotatable member 10*b*. Peripheral surface 10*a* forms a rigid hand gripping region on rotatable member to enable a user to hand squeeze the hand gripping region to enable hand rotation of the rotatable member. A first soft bump or soft bumps 16*a* are located on the peripheral surface 10*a* and a second soft bump or soft bumps 18*a* are located on the rigid peripheral surface 10*b* with the second soft bump spaced from and separated from the first soft bump to provide a padded hand gripping area on opposite sides of the peripheral surface 10*a* with the padded hand gripping area softer to the touch than the rigid handing gripping area without the soft bumps to thereby reduce hand trauma.

In the embodiments of FIG. 9–12 the rotatable member includes a resilient peripheral band with integral soft bumps. That is in the embodiment of FIG. 9 the resilient band 62 extends around the rigid peripheral surface 61*a* to form a peripheral surface 62*b* that forms a hand gripping region. In the embodiment of FIG. 10 the resilient band 69 extends around rigid peripheral surface 71*a* to form a peripheral surface 69*a*. In these embodiments the users hand is provided with a 360 degree cushion as the cushion extends around the peripheral surface that forms the hand gripping region. Similarly the embodiment of FIGS. 11 and 12 includes a peripheral surface 82*b* that forms a hand gripping region with the hand gripping region covering the integral soft bumps 82*a* that compress to allow a users hand to simultaneously engage the peripheral surface 82.

In the embodiment shown the soft bumps can be molded separately and adhesively secured, or can be molded on to the rigid portion of a pipe attachment product. It is also envisioned that the soft bumps can be integrally formed into the rigid plastic by forming portions of the rigid plastic with softer regions such as by air injection. In the event enhanced grip is required the bumps can include soft teeth, soft knurling or other disruptions to enhance the engagement between a users hand and the handle on the irrigation component. Other methods of securing the soft bumps is with an overmolding process or through multiple shot injection molding.

I claim:

1. An irrigation component for controlling a fluid there through comprising:
- a rigid housing;
- a rigid rotatable member extending therefrom;
- a rigid peripheral surface on said rigid rotatable member;
- a hand gripping region on said rigid peripheral surface to enable a user to hand squeeze the hand gripping region to enable hand rotation of the rotatable member;
- a first soft bump located on the peripheral surface; and
- a second soft bump located on the rigid peripheral surface with said second soft bump spaced from and separated from said first soft bump to provide a cushioned hand gripping area with said cushioned hand gripping area softer to the touch than said rigid handing gripping area without the soft bumps to thereby reduce hand trauma when rotating said irrigation component.

2. The irrigation component of claim 1 wherein the first soft bump comprises a first resilient pad and the second soft bump comprises a second resilient pad.

3. The irrigation component of claim 1 wherein the first soft bump and the second soft bump comprise a set of hemispherical shaped pads.

4. The irrigation component of claim 1 wherein the first soft bump and the second soft bump comprise overmolded protrusions.

5. The irrigation component of claim 1 wherein the first wherein the first soft bump and the second soft bump have a durometer less than the hand gripping region.

6. The irrigation component of claim 1 wherein the hand gripping region comprises a set of radially extending ears.

7. The irrigation component of claim 1 wherein the soft bumps have a compressive thickness that allows a portion of the flesh of a users hand to simultaneously engage the first and second soft bump and the rigid peripheral surface.

8. The irrigation component of claim 1 wherein the irrigation component comprises a screw-in irrigation drain.

9. The irrigation component of claim 1 wherein the irrigation component comprises a screw-in pipe tap.

10. A field attachable irrigation component for controlling a fluid there through comprising:
- a rigid housing having a thread thereon;
- a rotatable member extending therefrom;
- a hand gripping region on said rotatable member, said hand gripping region having a peripheral surface to enable a user to hand squeeze the hand gripping region to provide for hand rotation of the rotatable member; and
- a set of soft compressible bumps softer than said peripheral surface, said soft compressible bumps extending outward from the peripheral surface to form a hand cushion on the hand gripping region as a user squeezes and rotates the hand gripping region on said rotatable member.

11. The field attachable irrigation component of claim 10 wherein the peripheral surface is circular.

12. The field attachable irrigation component of claim 10 wherein the peripheral surface includes a set of ears extending therefrom.

13. The field attachable irrigation component of claim 12 wherein the soft bumps are located on the set of ears.

14. The field attachable irrigation component of claim 10 wherein the field attachable component comprises a pipe tap.

15. The field attachable irrigation component of claim 10 wherein the field attachable component comprises a drain valve.

16. The field attachable irrigation component of claim 10 wherein the soft bumps have a higher coefficient of friction than the peripheral surface of the field attachable component.

17. The field attachable irrigation component of claim 10 wherein the soft bumps are spaced closely around the peripheral surface sufficient to enable one or more soft bumps to engage a users hand during rotation of the field attachable comprising.

18. An irrigation component for controlling a fluid there through comprising:
- a first rigid member, said first member having a set of ears protruding therefrom;
- a second rigid member having an inner peripheral surface and an outer peripheral surface;
- a soft bump located on the outer peripheral surface of said second rigid member and being of a softer material that the outer peripheral surface;
- a second soft bump located on the outer peripheral surface with said second soft bump spaced from and separated from said first soft bump and being of a softer material that the outer peripheral surface, said first soft bump, said second soft bump and said outer peripheral surface providing a hand cushion softer to the touch than said outer peripheral surface without the soft bumps when rotating said irrigation component.

19. The irrigation component of claim 18 wherein the hand grip includes a frictional surface located on the inner peripheral surface to allow the rigid member to frictional engage only a portion of an irrigation component located therein.

20. The irrigation component of claim 18 wherein the hand grip includes second rigid member inner peripheral surface for mechanically engages a set of ears on an irrigation component.

21. The irrigation component of claim 19 wherein the soft bumps have an elongated shape and extend substantially parallel to an axis of rotation of the irrigation component.

22. The irrigation component of claim 18 wherein the soft bumps have a coefficient of friction greater than the rotateable tap to thereby enhance a user's grip of the irrigation component.

* * * * *